(12) United States Patent
Ke et al.

(10) Patent No.: US 11,509,873 B2
(45) Date of Patent: Nov. 22, 2022

(54) LIGHT SOURCE GENERATING DEVICE, PROJECTION APPARATUS AND LIGHT SOURCE GENERATION METHOD THEREOF

(71) Applicant: Coretronic Corporation, Hsin-Chu (TW)

(72) Inventors: Chi-Wen Ke, Hsin-Chu (TW); Hung-Wei Lin, Hsin-Chu (TW); Chun-Yi Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 822 days.

(21) Appl. No.: 16/245,221

(22) Filed: Jan. 10, 2019

(65) Prior Publication Data
US 2019/0222816 A1    Jul. 18, 2019

(30) Foreign Application Priority Data

Jan. 16, 2018   (CN) .......................... 201810039201.0

(51) Int. Cl.
*H04N 9/31*      (2006.01)
*G03B 21/20*     (2006.01)

(52) U.S. Cl.
CPC ......... *H04N 9/3182* (2013.01); *G03B 21/208* (2013.01); *G03B 21/2053* (2013.01);
(Continued)

(58) Field of Classification Search
CPC .................. G03B 21/00–64; H04N 9/31–3197
See application file for complete search history.

(56) References Cited

U.S. PATENT DOCUMENTS

2009/0040475 A1   2/2009   Sagawa
2010/0201956 A1   8/2010   Kimura
(Continued)

FOREIGN PATENT DOCUMENTS

CN    1676986    10/2005
CN    1734347    2/2006
(Continued)

OTHER PUBLICATIONS

Office Action of China Counterpart Application, dated Aug. 4, 2021, pp. 1-10.
(Continued)

*Primary Examiner* — Christopher A Lamb, II
(74) *Attorney, Agent, or Firm* — JCIPRNET (57) ABSTRACT

A light source generating device, a projection apparatus and a light source generation method are provided. The light source generating device includes a first light source, an auxiliary light source, a control device, a driver and a current command generator. The first light source generates a first light beam. The auxiliary light source generates an auxiliary light beam corresponding to the first light beam. The control device generates a first driving signal to drive the first light source. The driver generates an auxiliary driving signal to drive the auxiliary light source according to the gate control signal and a current command. The current command generator receives an indication signal, and generates the current command according to the indication signal, wherein the indication signal corresponds to a driving current of the first light source. The invention has an effect of enhancing brightness/chrominance.

23 Claims, 10 Drawing Sheets

(52) U.S. Cl.
CPC ......... *H04N 9/3155* (2013.01); *H04N 9/3164* (2013.01); *H04N 9/3197* (2013.01)

(56) References Cited

U.S. PATENT DOCUMENTS

| | | |
|---|---|---|
| 2012/0038892 A1 | 2/2012 | Kurtz et al. |
| 2013/0107230 A1* | 5/2013 | Murai ................. H04N 9/3114 353/85 |
| 2013/0155128 A1 | 6/2013 | Miyazaki |

FOREIGN PATENT DOCUMENTS

| | | |
|---|---|---|
| CN | 201986219 | 9/2011 |
| CN | 102625515 | 8/2012 |
| CN | 102722073 | 10/2012 |
| CN | 102928759 | 2/2013 |
| CN | 103181243 | 6/2013 |
| CN | 104519642 | 4/2015 |
| CN | 106154712 | 11/2016 |
| CN | 106292142 | 1/2017 |

OTHER PUBLICATIONS

"Office Action of China Counterpart Application", dated Jan. 5, 2021, p. 1-p. 10.
Office Action of China Counterpart Application, dated Jan. 6, 2022, pp. 1-10.

* cited by examiner

LIGHT SOURCE GENERATING DEVICE, PROJECTION APPARATUS AND LIGHT SOURCE GENERATION METHOD THEREOF

CROSS-REFERENCE TO RELATED APPLICATION

This application claims the priority benefit of China application serial no. 201810039201.0, filed on Jan. 16, 2018. The entirety of the above-mentioned patent application is hereby incorporated by reference herein and made a part of this specification.

BACKGROUND OF THE INVENTION

Field of the Invention

The invention relates to a light source generating device, a projection apparatus and a light source generation method thereof, and particularly relates to a light source generating device, a projection apparatus and a light source generation method thereof able to improving brightness/chrominance.

Description of Related Art

Along with advance of electronic technology, electronic devices have become indispensable tools in people's daily life. Especially, today's electronic products provide a good quality interface, which is an important feature thereof.

In a projection apparatus, according to a known technology, a fixed number of light-emitting diodes (LEDs) is generally applied to generate a required light source, and through an inbuilt driver, the LEDs respectively are driven to generate a red light, a blue light and a green light and then respectively generate lights with different wavelengths. However, under the system framework of the know technology, in case of a requirement to enhance a brightness of one of the color lights, the LEDs are additionally configured to serve as an auxiliary light source. However, if a light-emitting brightness and a light-emitting time of the auxiliary light source are not accordance with a light-emitting brightness and a light-emitting time of the corresponding light source, an image display quality of the projection apparatus is influenced. Therefore, how to let the operations of the auxiliary light source and the corresponding light source are accordance with each other is an important subject for related technicians of the field.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention were acknowledged by a person of ordinary skill in the art.

SUMMARY OF THE INVENTION

The invention is directed to a light source generating device, a projection apparatus and a light source generation method thereof, in which an auxiliary light source is applied to enhance a brightness of a generated light and/or enhance chrominance quality of the light.

Other objects and advantages of the invention can be further illustrated by the technical features broadly embodied and described as follows.

In order to achieve one or a portion of or all of the objects or other objects, an embodiment of the invention provides a light source generating device including a first light source, an auxiliary light source, a control device, a driver and a current command generator. The first light source generates a first light beam. The auxiliary light source generates an auxiliary light beam corresponding to the first light beam. The control device generates a first driving signal to drive the first light source. The driver is coupled to the control device to receive a gate control signal, and generates an auxiliary driving signal to drive the auxiliary light source according to the gate control signal and a current command. The current command generator is coupled to the control device to receive an indication signal, and generates the current command according to the indication signal. The indication signal corresponds to a driving current of the first light source.

In order to achieve one or a portion of or all of the objects or other objects, an embodiment of the invention provides a projection apparatus including the aforementioned light source generating device, a light valve and a projection lens. The light source generating device provides an illumination light beam, where the illumination light beam includes the aforementioned first light beam and the auxiliary light beam. The light valve is located on a transmission path of the illumination light beam, and converts the illumination light beam into an image light beam. The projection lens is located on a transmission path of the image light beam.

In order to achieve one or a portion of or all of the objects or other objects, an embodiment of the invention provides a light source generation method including: providing a first light source to generate a first light beam; providing an auxiliary light source to generate an auxiliary light beam corresponding to the first light beam; providing a control device to generate a first driving signal to drive the first light source; providing a driver to generate an auxiliary driving signal to drive the auxiliary light source according to a gate control signal and a current command; and providing a current command generator to receive an indication signal, and generate the current command according to the indication signal, wherein the indication signal corresponds to a driving current of the first light source.

According to the above description, in the embodiments of the invention, the auxiliary light source is provided to generate the auxiliary light corresponding to the first light beam, and the current command generator is provided to generate the current command according to the received indication signal, and the driver is controlled by the current command to generate the auxiliary driving signal to drive the auxiliary light source. In this way, a brightness of the auxiliary light beam provided by the auxiliary light source is produced according to a brightness of the first light beam, so as to enhance the brightness/chrominance of the light beam.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
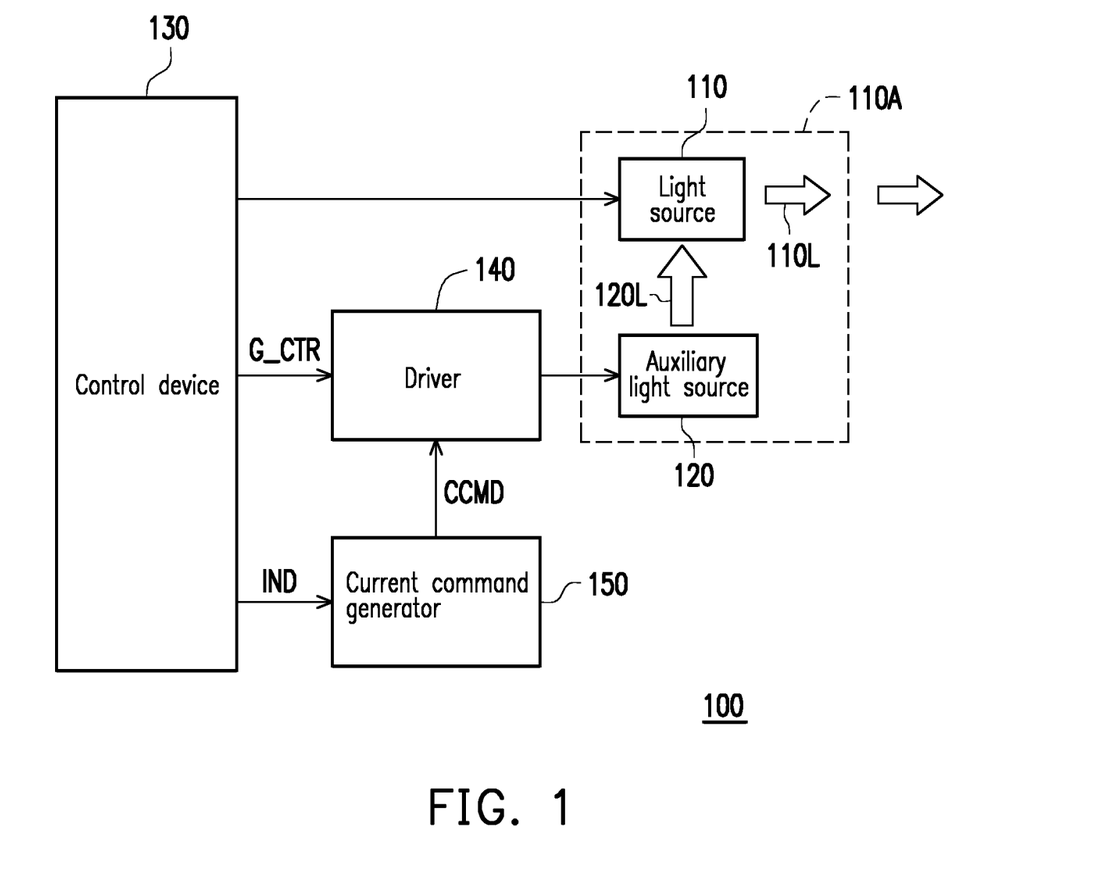
FIG. 1 is a schematic diagram of a light source generating device according to an embodiment of the invention.

Referring to FIG. 1, FIG. 1 is a schematic diagram of a light source generating device according to an embodiment of the invention. The light source generating device 100 may be disposed in a projection apparatus. The light source generating device 100 includes a light source 110, an auxiliary light source 120, a control device 130, a driver 140 and a current command generator 150. In the present embodiment, the light source 110 and the auxiliary light source 120 are, for example, combined/integrated into a light source module 110A, though the invention is not limited thereto. The light source 110 is used for generating a light beam 110L, and the auxiliary light source 120 generates an auxiliary light beam 120L corresponding to the light beam 110L generated by the light source 110. The control device 130 is coupled to the light source 110, and generates a driving signal to drive the light source 110. The control device 130 is coupled to the driver 140, and provides a gate control signal G_CTR to the driver 140. In the present embodiment, the gate control signal G_CTR corresponds to a driving timing to drive the light source 110. To be specific, when the gate control signal G_CTR is enabled, the light source 110 is lighted; oppositely, when the gate control signal G_CTR is disabled, the light source 110 is not lighted. In the present embodiment, the light source 110 and the auxiliary light source 120 may be composed of light-emitting diodes (LED) or laser diodes, though the invention is not limited thereto.

On the other hand, the driver 140 receives a current command CCMD, and generates an auxiliary driving signal according to the current command CCMD and the gate control signal G_CTR, wherein the auxiliary driving signal is provided to the auxiliary light source 120 to drive the auxiliary light source 120.

In the present embodiment, the current command generator 150 is coupled to the control device 130, and receives an indication signal IND provided by the control device 130. The current command generator 150 generates the current command CCMD according to the indication signal IND, and provides the current command CCMD to the driver 140. In the present embodiment, the control device 130 may generate the indication signal IND corresponding to a driving current of the light source 110.

In the present embodiment, when a brightness of the light beam 110L generated by the light source 110 is to be set, the control device 130, for example, receives a current setting value, and generates the driving current to drive the light source 110 according to the received current setting value. Meanwhile, the control device 130 may generate the indication signal IND according to the driving current, and provides the indication signal IND to the current command generator 150. The current command generator 150 generates the current command CCMD according to the indication signal IND, and provides the current command CCMD to the driver 140. In this way, the driver 140 may generate the auxiliary driving signal to drive the auxiliary light source 120 according to the received current command CCMD.

According to the above description, can be known that, the driver 140 may control the brightness of the auxiliary light beam 120L generated by the auxiliary light source 120 according to the current command CCMD, and control the brightness of the auxiliary light beam 120L generated by the auxiliary light source 120 which can correspond to the brightness of the light beam 110L generated by the light source 110. Moreover, the driver 140 may determine a time point when the auxiliary light source 120 generates the auxiliary light beam 120L according to the gate control signal G_CTR. In the present embodiment, when the gate control signal G_CTR is enabled, the auxiliary light source 120 may be lighted; oppositely, when the gate control signal G_CTR is disabled, the auxiliary light source 120 is not lighted. In the present embodiment, the time points to light the auxiliary light source 120 and the light source 110 are, for example, synchronous, though the invention is not limited thereto. However, the time points to light the auxiliary light source 120 and the light source 110 may be adjusted according to an actual requirements, and in other embodiments, the time points to light the auxiliary light source 120 and the light source 110 may be asynchronous.

It should be noted that in the present embodiment, through the control device 130 measuring or detecting a magnitude of the current flowing through the light source 110, a magnitude of the driving current received by the light source 110 may be learned. A hardware framework used for measuring/detecting the current magnitude may be implemented based on any current detecting principle well known by those skilled in the art, which is not limited by the invention.

Figure 2:
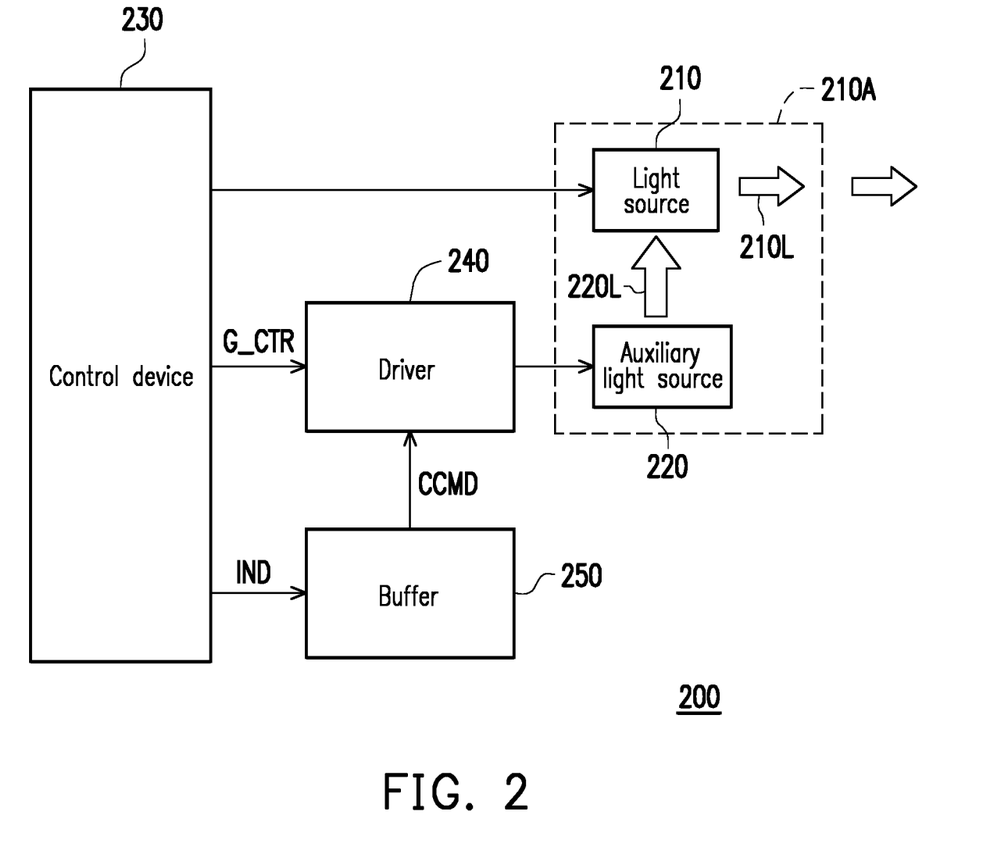
FIG. 2 is a schematic diagram of a light source generating device according to another embodiment of the invention.

Referring to FIG. 2, FIG. 2 is a schematic diagram of a light source generating device according to another embodiment of the invention. The light source generating device 200 includes a light source 210, an auxiliary light source 220, a control device 230, a driver 240 and a buffer 250. The light source 210 is used for generating a light beam 210L, and the auxiliary light source 220 generates an auxiliary light beam 220L corresponding to the light beam 210L generated by the light source 210. In the present embodiment, the buffer 250 serves as a current command generator. Moreover, the control device 230 may generate the indication signal IND in real-time according to a magnitude of the driving current received by the light source 210. In the present embodiment, an input terminal of the buffer 250 receives the indication signal IND, and an output terminal of the buffer 250 generates the current command CCMD, and transmits the current command CCMD to the driver 240. Therefore, it should be understand that, through the buffer 250, a current value of the driving current received by the auxiliary light source 220 may quickly adjusted according to a current value variation of the driving current received by the light source, so as to achieve an effect of precise synchronization.

Figure 3:
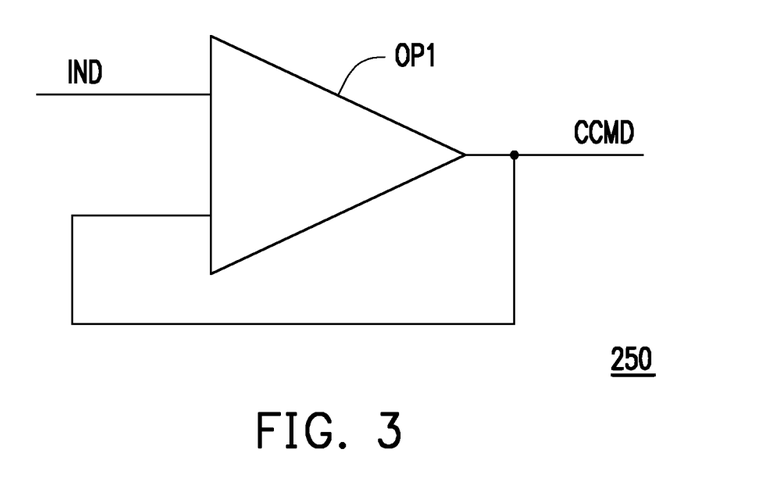
FIG. 3 is a schematic diagram of an implementation of a buffer according to an embodiment of the invention.

Regarding an implementation detail of the buffer 250, FIG. 3 is a schematic diagram of an implementation of a buffer according to an embodiment of the invention. In FIG. 3, the buffer 250 may be a voltage follower. The buffer 250 includes an operational amplifier OP1, wherein an input terminal of the operational amplifier OP1 receives the indication signal IND, another input terminal of the operational amplifier OP1 is coupled to an output terminal of the operational amplifier OP1, and the output terminal of the operational amplifier OP1 generates the current command CCMD.

In the present embodiment, the current command CCMD and the indication signal IND may be signals with a same voltage value, though the invention is not limited thereto.

Certainly, in other embodiments, other types of buffer circuits well known by those skilled in the art may also be used for constructing the buffer 250, i.e., implementation of the buffer is not limited by the invention. In other embodiments, the current command CCMD and the indication signal IND may also be signals with different voltage values.

Figure 4:
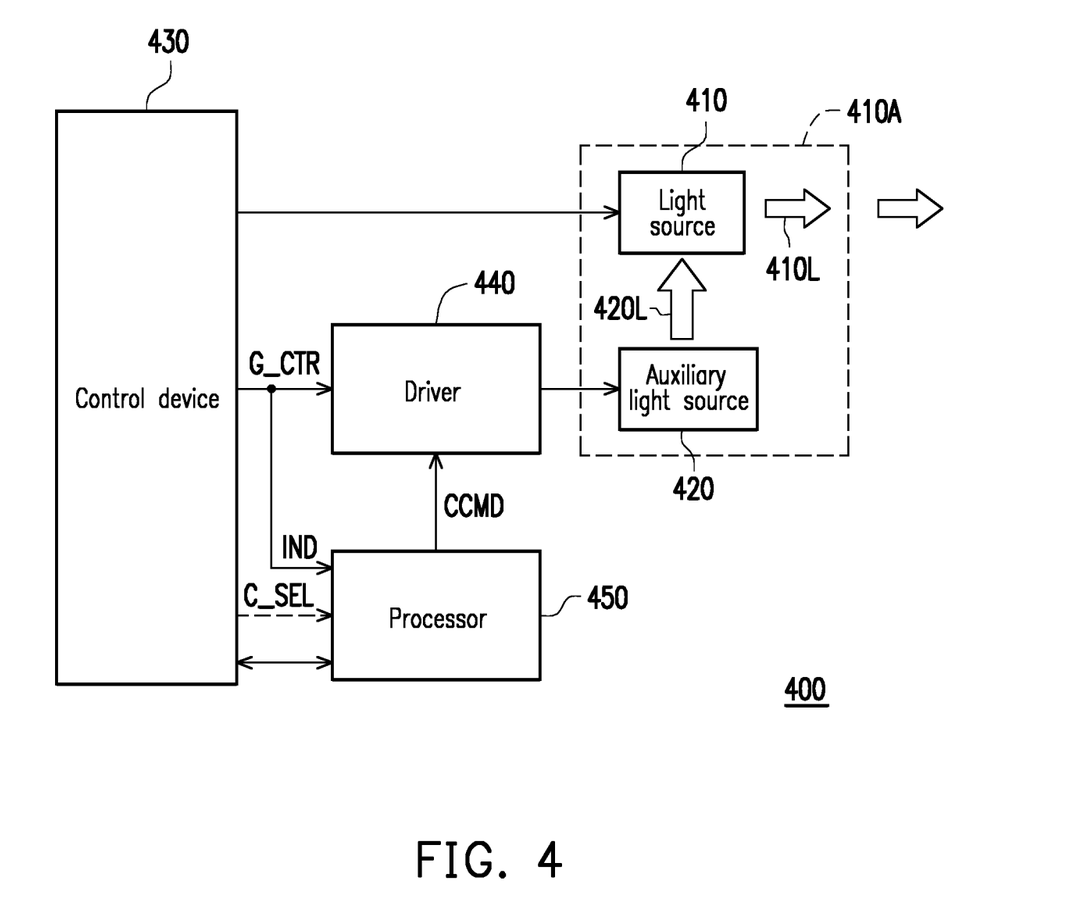
FIG. 4 is a schematic diagram of a light source generating device according to another embodiment of the invention.

Referring to FIG. 4, FIG. 4 is a schematic diagram of a light source generating device according to another embodiment of the invention. The light source generating device 400 may be constructed/configured in a projection apparatus. The light source generating device 400 includes a light source 410, an auxiliary light source 420, a control device 430, a driver 440 and a processor 450. The light source 410 is used for generating a light beam 410L, and the auxiliary light source 420 generates an auxiliary light beam 420L corresponding to the light beam 410L generated by the light source 410. In the present embodiment, the processor 450 serves as a current command generator. A main difference between the present embodiment and the aforementioned embodiments is that the driver 440 and the processor 450 commonly receive the gate control signal G_CTR provided by the control device 430, wherein the processor 450 receives the gate control signal G_CTR to serve as the indication signal IND.

Regarding current value setting, when a current setting value used for driving the light source 410 is to be set, the current setting value corresponding to the light source 410 may be written into the processor 450. The processor 450 transmits the current setting value to the control device 430. The control device 430 may adjust the driving signal used for driving the light source 410 according to the received current setting value, such that the driving current provided by the driving signal used for driving the light source 410 is equal to the current setting value. However, in the present embodiment, if the action that the control device 430 adjusts the driving current to the current setting value is not immediately effective and thus requires a fixed delay time, while the processor 450 provides the current setting value to the control device 430, the processor 450 may not write the current command CCMD to the driver 440. In a specific operation, the processor 450 may timings according to the gate control signal G_CTR, and may generate a setting time point by calculating a pulse number of the gate control signal G_CTR. In this way, the processor 450 may generate the current command CCMD according to the current setting value, and may write the current command CCMD to the driver 440 at the setting time point.

Further, in the present embodiment, a predetermined value may be set according to a time delay required by the control device 430 to adjust the driving current of the light source 410. The processor 450 may obtain the setting time point by calculating whether the pulse number of the gate control signal G_CTR is greater than or equal to the predetermined value. Namely, when the processor 450 determines that the pulse number of the gate control signal G_CTR is greater than or equal to the predetermined value, the processor 450 may write the current command CCMD to the driver 440, so as to adjust the brightness of the auxiliary light beam 420L generated by the auxiliary light source 420.

According to the aforementioned method, the time point when the current command CCMD is written to the driver 440 may be closer to the time point when the driving current of the light source 410 is adjusted. Namely, the brightness of the light source 410 and the auxiliary light source 420 may be synchronously adjusted, so as to mitigate a problem of display image quality reduction caused by brightness unevenness.

In another embodiment, the processor 450 may also receive a channel selection signal C_SEL to serve as the indication signal IND. In the present embodiment, the channel selection signal C_SEL may be used for indicating whether the light source 410 is selected and performing a lighting operation. The processor 450 may decode the channel selection signal C_SEL to acquire related information of a time interval when the light source 410 is lighted. Namely, by decoding the channel selection signal C_SEL, the processor 450 may acquire related information provided by the gate control signal G_CTR to execute related operation.

Figure 5A:
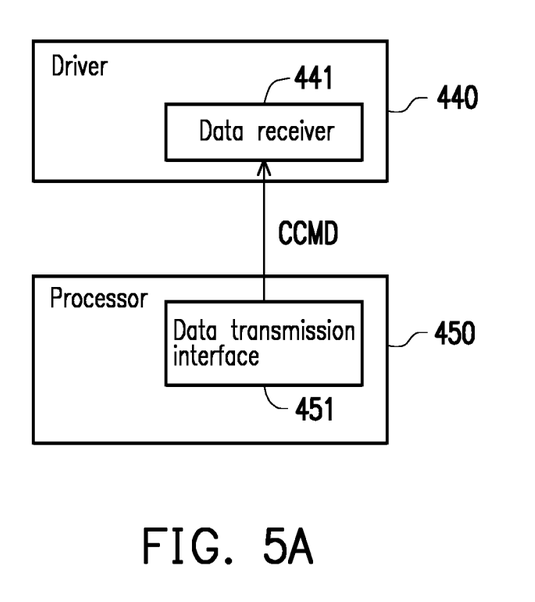
FIG. 5A is a schematic diagram of a transmission method of a current command according to an embodiment of the invention.

Referring to FIG. 5A, FIG. 5A is a schematic diagram of a transmission method of the current command according to an embodiment of the invention. Based on the embodiment of FIG. 4, the driver 440 has a data receiver 441, and the processor 450 has a data transmission interface 451. The data transmission interface 451 is used for transmitting the current command CCMD, and the data receiver 441 of the driver 440 is used for receiving the current command CCMD. In the present embodiment, the data transmission interface 451 may be an inter-integrated circuit (I²C) interface, a serial peripheral interface (SPI), a universal asynchronous receiver and transmitter (UART) or a pulse width modulation (PWM) signal transmission interface, or any other serial or parallel transmission interface well known by those skilled in the art. The data receiver 441 is a receiving interface corresponding to the data transmission interface 451. When the data transmission interface 451 is the I²C interface, the SPI or the UART, the data receiver 441 may have a corresponding decoding circuit. When the data transmission interface 451 is the PWM signal transmission interface, the data receiver 441 may be a low pass filter (LP filter).

Figure 5B:
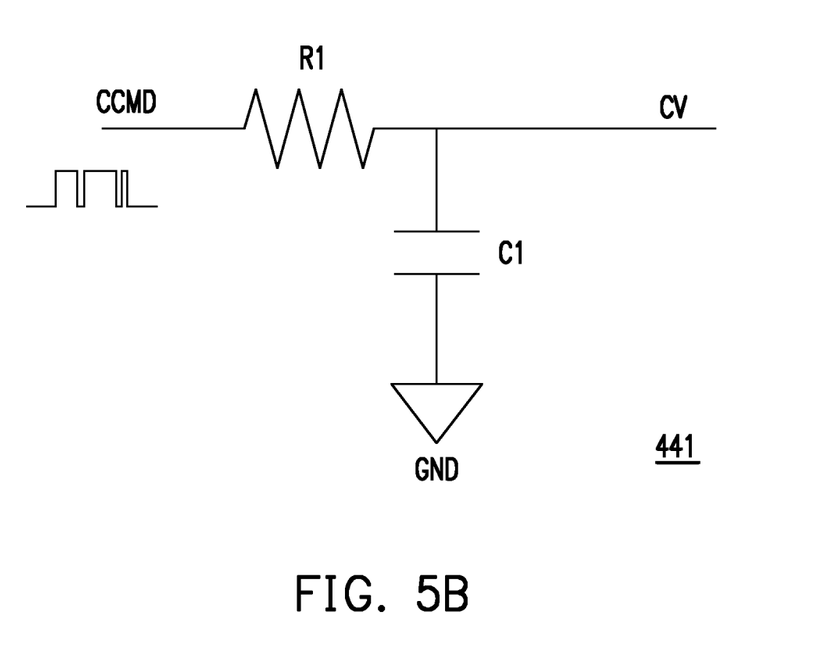
FIG. 5B is a schematic diagram of an implementation of a data receiver according to an embodiment of the invention.

Referring to FIG. 5B, FIG. 5B is a schematic diagram of an implementation of a data receiver according to an embodiment of the invention. For example, the data transmission interface 451 is the PWM signal transmission interface and the data receiver 441 is the LP filter, the data receiver 441 may include a resistor R1 and a capacitor C1. One end of the resistor R1 receives the current command CCMD, and another end of the resistor R1 is coupled to a first end of the capacitor C1, and a second end of the capacitor C1 is coupled to a ground voltage GND. A coupling end of the resistor R1 and the capacitor C1 forms an output terminal of the data receiver 441, and generates a filtered current command CV. In the present embodiment, a ratio between a positive pulse width and a negative pulse width of the current command CCMD is greater, then a voltage value of the filtered current command CV generated by the data receiver 441 is higher. Comparatively, in the present embodiment, the ratio between the positive pulse width and the negative pulse width of the current command CCMD is smaller, then the voltage value of the filtered current command CV generated by the data receiver 441 is lower. The filtered current command CV is an analog signal.

Figure 6:
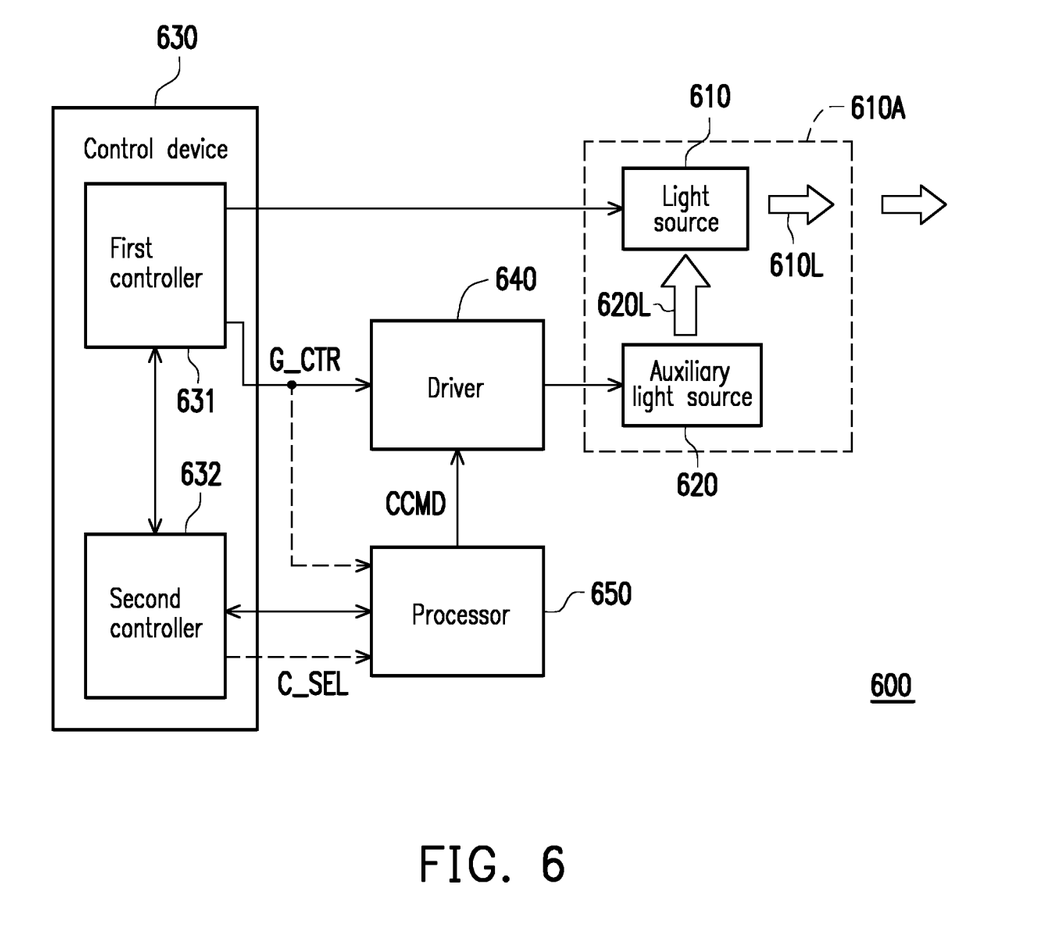
FIG. 6 is a schematic diagram of a light source generating device according to another embodiment of the invention.

Referring to FIG. 6, FIG. 6 is a schematic diagram of a light source generating device according to another embodiment of the invention. The light source generating device 600 includes a light source 610, an auxiliary light source 620, a control device 630, a driver 640 and a processor 650. The light source 610 is used for generating a light beam 610L, and the auxiliary light source 620 generates an auxiliary light beam 620L corresponding to the light beam 610L generated by the light source 610. The processor 650 serves as a current command generator. A main difference between the present embodiment and the embodiment of FIG. 4 is that the control device 630 includes a first controller 631 and a second controller 632. The first controller 631 may generate a driving signal of the light source 610, and provides the gate control signal G_CTR corresponding to the light source 610. The second controller 632 is coupled to the processor 650, and implements data transmission with the processor 650 through a communication interface, and transmits the channel selection signal C_SEL to the processor 650. Moreover, the first controller 631 and the second controller 632 may communicate with each other through a predetermined communication protocol. The above communication protocol may be any serial or parallel communication protocol, which is not limited by the invention.

It should be noted that in the present embodiment, the light beam 610L and the auxiliary light beam 620L respectively generated by the light source 610 and the auxiliary light source 620 may respectively have a first wavelength and a second wavelength that are the same with each other, or may respectively have the first wavelength and the second wavelength that are different to each other. Moreover, in the present embodiment, the light source 610 and the auxiliary light source 620 may be combined/integrated into one light source module 610A to generate a light beam having a third wavelength. In detail, the light source 610 and the auxiliary light source 620 may be combined to generate the light beam with the third wavelength, wherein the third wavelength may be the same with the first wavelength/the second wavelength, or different to the first wavelength/the second wavelength. For example, by configuring a wavelength conversion material within the light source 610 or configuring the wavelength conversion material between the light source 610 and the auxiliary light source 620, the light source 610 and the auxiliary light source 620 may be combined to generate the light beam with the third wavelength. In the present embodiment, the wavelength conversion material is, for example, phosphor powder, and the light beam 610L provided by the light source 610 and the auxiliary light beam 620L provided by the auxiliary light source 620 may be excited by the phosphor powder in the light source 610 (or the phosphor powder between the light source 610 and the auxiliary light source 620), though the invention is not limited thereto. For example, in the present embodiment, the light beam 610L generated by the light source 610 is a green (the first wavelength) light, the auxiliary light beam 620L generated by the auxiliary light source 620 is a blue (the second wavelength) light, and the light beam 610L generated by the light source 610 and the auxiliary light beam 620L generated by the auxiliary light source 620 may be commonly excited by the phosphor powder, and the light beam generated by the light source module 610A composed of the light source 610 and the auxiliary light source 620 is a green (the third wavelength) light, wherein the third wavelength may be the same with or different to the first wavelength. However, the aforementioned colors are only an example used for describing the present embodiment, i.e. the first wavelength, the second wavelength and the third wavelength of the invention are not limited to the aforementioned colors.

Figure 7:
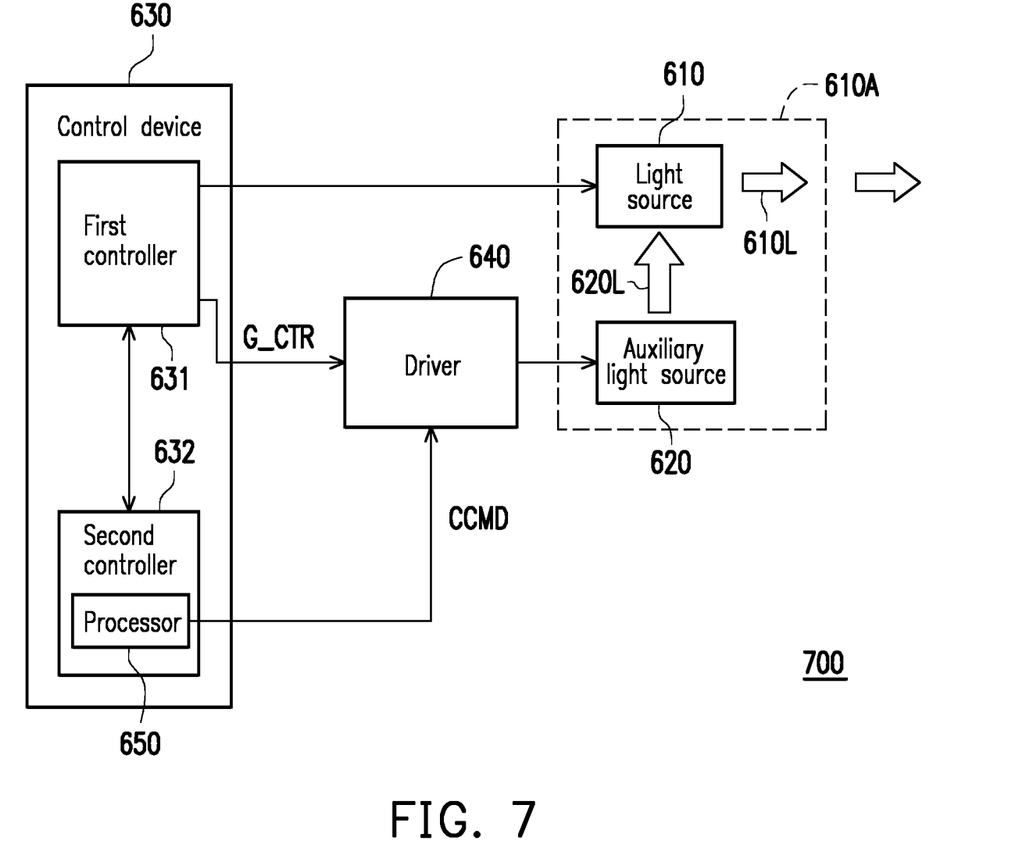
FIG. 7 is a schematic diagram of another implementation of the light source generating device of the embodiment of FIG. 6 of the invention.

Referring to FIG. 7, FIG. 7 is a schematic diagram of another implementation of the light source generating device of the embodiment of FIG. 6 of the invention. A main difference between the present embodiment and the embodiment of FIG. 6 is that in the light source generating device 700 of FIG. 7, the processor 650 is disposed in the second controller 632. In this way, the processor 650 and the second controller 632 may not need to transmit information through the communication interface, by which a circuit cost is reduced, and a system performance is improved.

Figure 8:
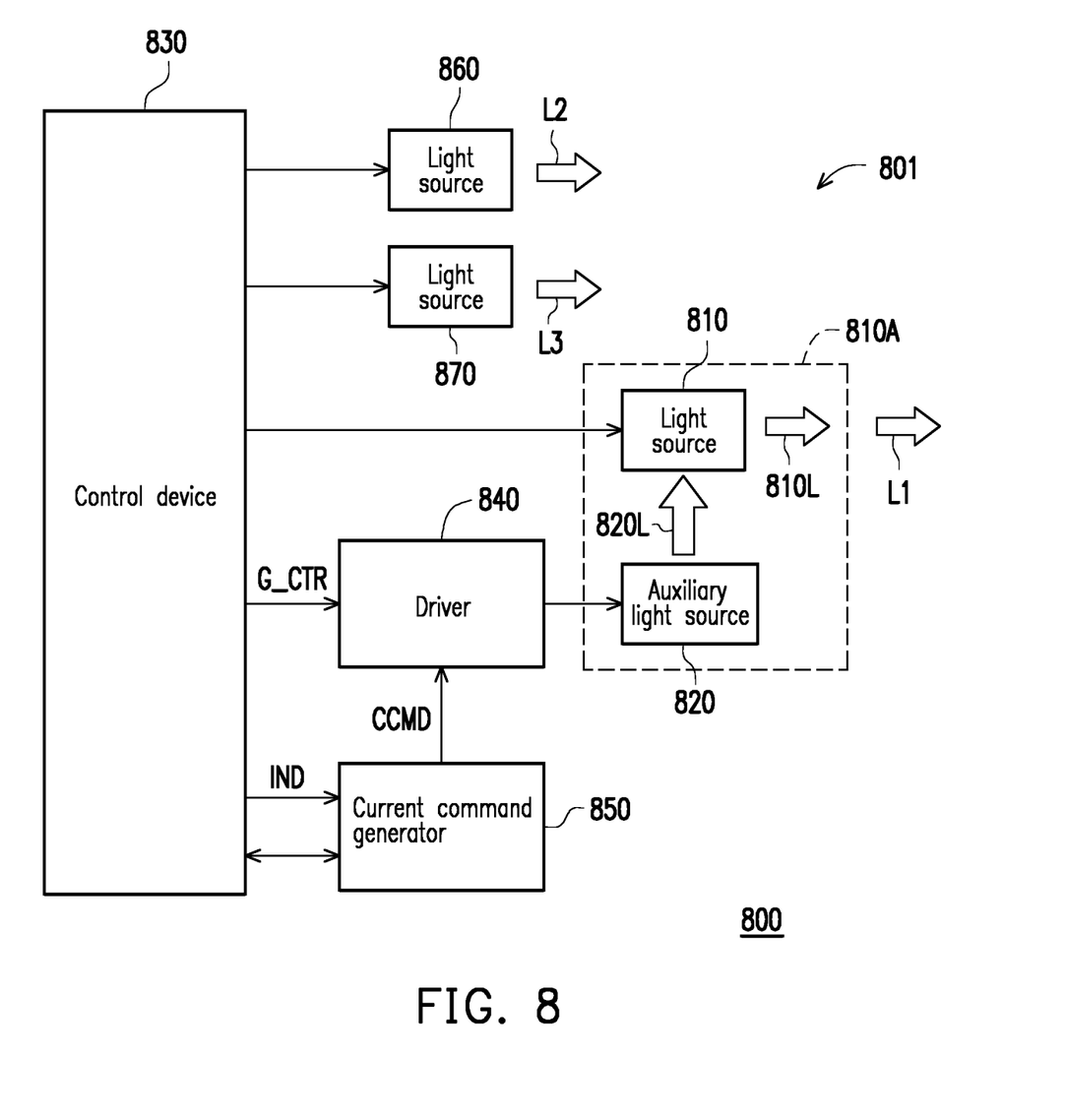
FIG. 8 is a schematic diagram of a projection apparatus according to an embodiment of the invention.

Referring to FIG. 8, FIG. 8 is a schematic diagram of a projection apparatus according to an embodiment of the invention. The projection apparatus 800 includes a light source generating device 801. The light source generating device 801 includes a plurality of light sources 810, 860, 870, an auxiliary light source 820 corresponding to the light source 810, a control device 830, a driver 840 and a current command generator 850. The light source 810 and the auxiliary light source 820 are combined into a light source module 810A to commonly provide a green (a first color) light beam L1. The light sources 810, 860, 870 are coupled to the control device 830, and are adapted to respectively provide light beams 810L, L2, L3 of a plurality of different wavelengths, which are, for example, a green light beam 810L, a red (a second color) light beam L2 and a blue (a third color) light beam L3. In the present embodiment, the first color and the second color are different, though the invention is not limited thereto. In other embodiments, the first color and the second color may be the same, though the invention is not limited thereto. Certainly, in other embodiments, the number of the light sources included in the light source generating device may be one or plural, which is not limited by the invention.

The light source 810 is used for generating the light beam 810L. The auxiliary light source 820 is coupled to the driver 840, and is used for generating an auxiliary light beam 820L corresponding to the light beam 810L generated by the light source 810. In the present embodiment, the light beam 810, for example, provides the green light beam 810L, the auxiliary light source 820 may generate the blue light beam 820L, though the invention is not limited thereto. In this way, the chrominance and/or brightness of the green (the first color) light beam L1 commonly provided by the combination of the light beam 810 and the auxiliary light source 820 is effectively improved, so as to improve the imaging quality of the projection apparatus 800.

It should be noted that the light sources 810, 860, 870 and the auxiliary light source 820 of the present embodiment may be composed of LEDs or laser diodes, though the invention is not limited thereto.

The driver 840 is coupled to the control device 830, and receives the gate control signal G_CTR transmitted by the control device 830. In the present embodiment, the gate control signal G_CTR may correspond to a time interval when the light source 810 is lighted. The driver 840 is coupled to the current command generator 850 to receive the current command CCMD provided by the current command generator 850. The current command generator 850 is coupled to the control device 830 to receive the indication signal IND transmitted by the control device 830, and generates the current command CCMD according to the indication signal IND and a current predetermined value written from external.

In the present embodiment, the indication signal IND may be the gate control signal G_CTR or a channel selection signal (for example, the channel selection signal C_SEL of FIG. 4). In the present embodiment, the light source generating device 801 includes three light source channels (the light sources 810, 860 and 870). Therefore, the corresponding channel selection signal may have two bits. The two-bit channel selection signal may indicate four channel selection states, as shown in a following table 1:

TABLE 1

|  | Light source 810 | Light source 860 | Light source 870 |
|---|---|---|---|
| (0, 0) | Unselected | Unselected | Unselected |
| (0, 1) | Selected | Unselected | Unselected |
| (1, 0) | Unselected | Selected | Unselected |
| (1, 1) | Unselected | Unselected | Selected |

In the table 1, according to the channel selection signal, the selected light source may be lighted according to the corresponding driving signal, and the unselected light sources are not lighted.

However, the above table 1 is only an example, and the selection relationship between the channel selection signal and the light sources 810, 860, 870 may be changed according to an actual requirement, which is not limited by the invention.

Figure 9A:
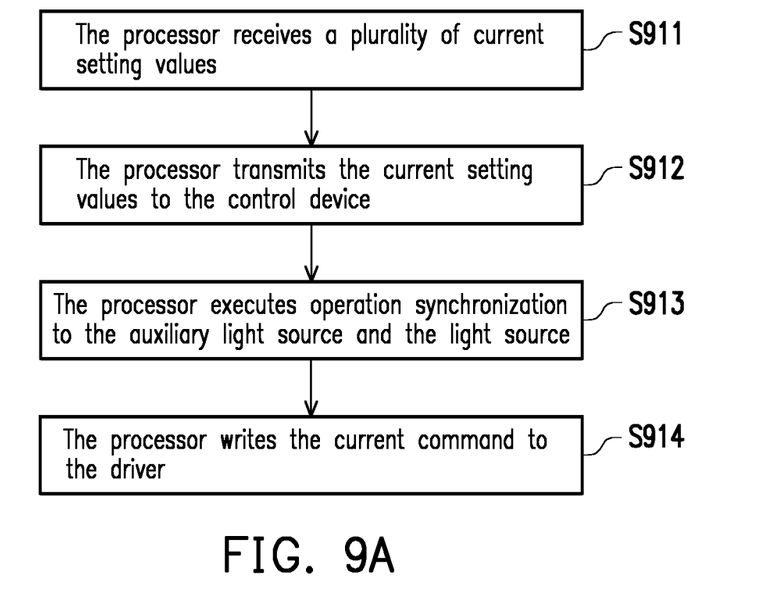
FIG. 9A and FIG. 9B are flowcharts illustrating a light source synchronous operation according to an embodiment of the invention.
Figure 9B:
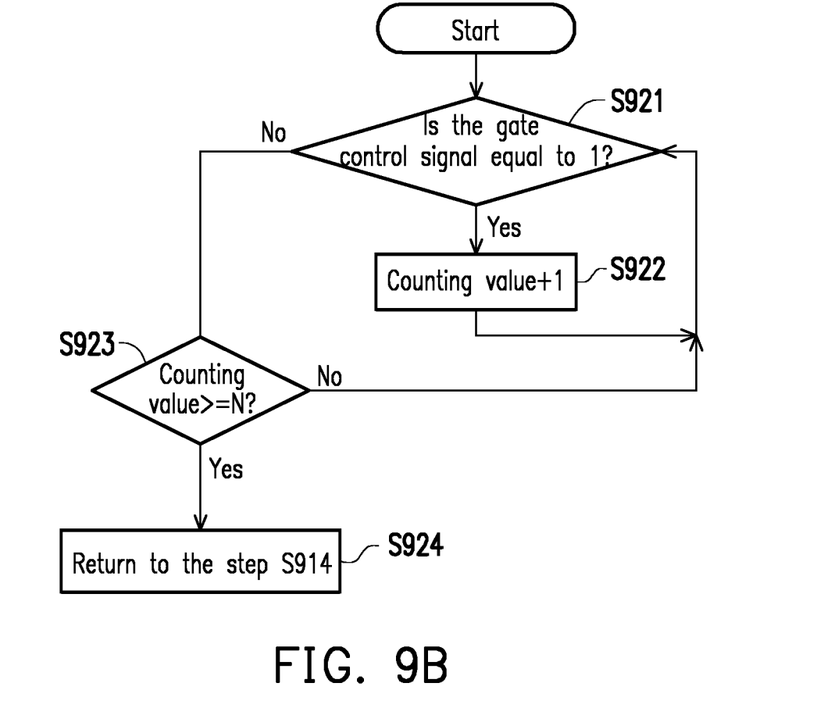

Referring to FIG. 8, FIG. 9A and FIG. 9B for a method to executing synchronizing operations for the auxiliary light source 820 and the light source 810 by the current command generator 850, wherein FIG. 9A and FIG. 9B are flowcharts illustrating a light source synchronous operation according to an embodiment of the invention. Referring to FIG. 9A, in step S911, the processor (serving as the current command generator 850) may receive a plurality of current setting values from external, wherein the current setting values may respectively correspond to setting values of the driving currents of the light sources 810, 860 and 870. Then, in step S912, the processor transmits the current setting values to the control device 830. Moreover, in step S913, the processor synchronizes the operations of the auxiliary light source 820 and the light source 810. Referring to FIG. 9B, during the process or operation synchronization, in step S921, the processor determines whether the gate control signal G_CTR is in a logic high level "1", and if yes, in step S922, the processor adds a counting value by 1 (the counting value+1), and when the gate control signal G_CTR is not in the logic high level "1", a step S923 is executed to compare the counting value with a predetermined value N. When the counting value is greater than or equal to the predetermined value N, the step S914 of FIG. 9A is executed, conversely, when the counting value is smaller than the predetermined value N, the flow returns to the step S921 to determine whether the gate control signal G_CTR is in the logic high level "1", and in collaboration with the step S922, the pulse number of the gate control signal G_CTR is accumulated until the counting value is greater than or equal to the predetermined value N.

Referring back to FIG. 9A, when the counting value is greater than or equal to the predetermined value N, in the step S914, the processor writes the current command CCMD to the driver 840, and synchronously adjusts the brightness of the auxiliary light source 820 and the brightness of the corresponding light source 810.

Figure 10:
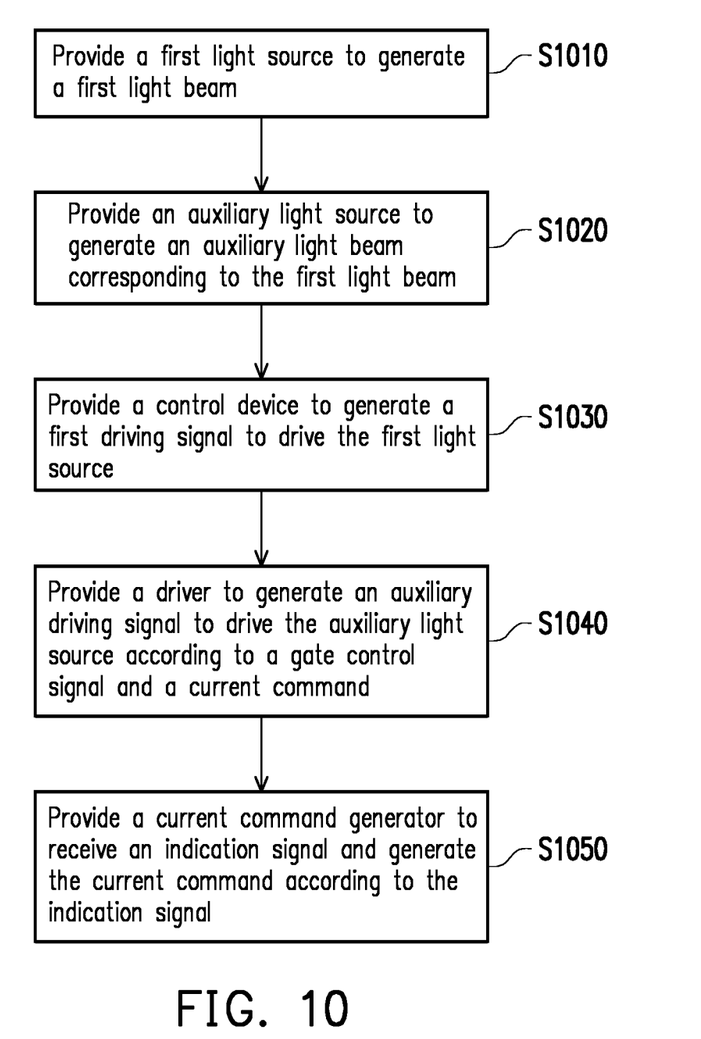
FIG. 10 is a flowchart illustrating a light source generation method according to an embodiment of the invention.

Referring to FIG. 10, FIG. 10 is a flowchart illustrating a light source generation method according to an embodiment of the invention. The light source generation method of FIG. 10 is adapted to the projection apparatus, and includes a step S1010 of providing a first light source to generate a first light beam; a step S1020 of providing an auxiliary light source to generate an auxiliary light beam corresponding to the first light beam; a step S1030 of providing a control device to generate a first driving signal to drive the first light source; a step S1040 of providing a driver to generate an auxiliary driving signal to drive the auxiliary light source according to a gate control signal and a current command; and a step S1050 of providing a current command generator to receive an indication signal and generate the current command according to the indication signal, wherein the indication signal corresponds to a driving current of the first light source.

Implementation details of the above steps have been described in detail in the aforementioned embodiments, and details thereof are not repeated.

The hardware framework of the control device, the first controller, the second controller and the process of the aforementioned embodiments may be processors with computation capability, or may be hardware circuits designed through a hardware description language (HDL) or any other digital circuit well known by those skilled in the art, and implemented through a field programmable gate array (FPGA), a complex programmable logic device (CPLD) or an application-specific integrated circuit (ASIC).

Figure 11:
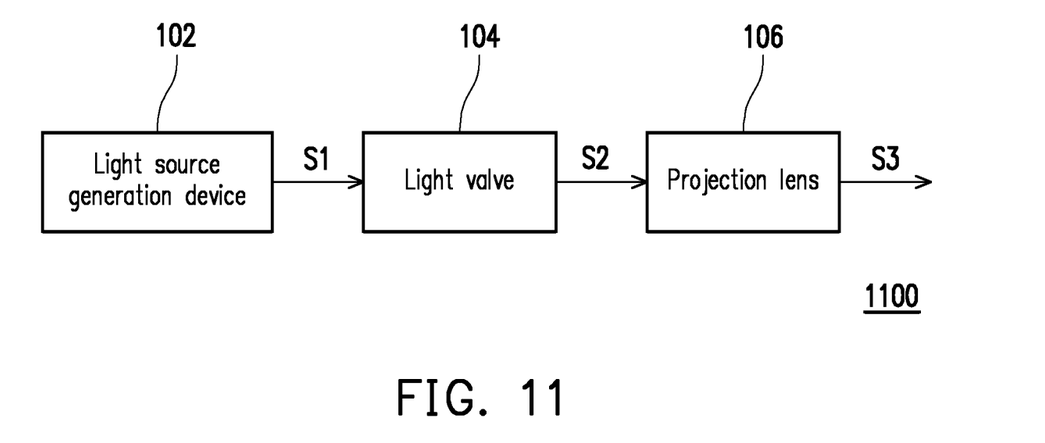
FIG. 11 is a schematic diagram of a projection apparatus according to another embodiment of the invention.

FIG. 11 is a schematic diagram of a projection apparatus according to another embodiment of the invention. Referring to FIG. 11, the projection apparatus 1100 includes a light source generating device 102, a light valve 104 and a projection lens 106. The light source generating device 102 is used for providing an illumination light 51. The light valve 104 is located on a transmission path of the illumination light beam 51 to convert the illumination light beam 51 into an image light beam S2. The projection lens 106 is located on a transmission path of the image light beam S2. In the present embodiment, the image light beam S2 passes through the projection lens 106 to form a projection light beam S3. In an embodiment, the illumination light beam 51 includes the light beam 110L (or 210L, 410L, 610L, 810L) and the auxiliary light beam 120L (or 220L, 420L, 620L, 820L) of the aforementioned embodiments. In an embodiment, the illumination light beam 51 may further include the light beams L2, L3 of the aforementioned embodiment.

In summary, the embodiments of the invention provide the current command generator, which writes the current command to the driver according to the indication signal corresponding to the driving current of the first light source. The brightness of the auxiliary light source and the corresponding first light source and the lighting time point are are accordance with each other, so that under the premise of not influencing the display quality, the brightness/chrominance of the provided light beam is effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source generating device, comprising:
    a first light source, adapted to generate a first light beam, wherein the first light source comprises at least one first light emitting diode or at least one first laser diode;
    an auxiliary light source, adapted to generate an auxiliary light beam corresponding to the first light beam, wherein the auxiliary light source comprises at least one second light emitting diode or at least one second laser diode;
    a control device, adapted to generate a first driving signal to drive the first light source;
    a driver, coupled to the control device to receive a gate control signal, and adapted to generate an auxiliary driving signal to drive the auxiliary light source according to the gate control signal and a current command; and
    a current command generator, coupled to the control device to receive an indication signal transmitted by the control device, and adapted to according to the indication signal to generate the current command to transmit to the driver to drive the auxiliary light source,
    wherein the indication signal corresponds to a driving current of the first light source.

2. The light source generating device according to claim 1, wherein the control device provides the gate control signal and the indication signal.

3. The light source generating device according to claim 1, wherein the driver controls a time point when the auxiliary light source emits the auxiliary light beam according to the gate control signal, and the driver controls a brightness of the auxiliary light beam generated by the auxiliary light source according to the current command.

4. The light source generating device according to claim 1, wherein the first light source generates the first light beam according to the driving current.

5. The light source generating device according to claim 4, wherein the current command generator comprises:
    a buffer, receiving the indication signal, and generating the current command according to the indication signal.

6. The light source generating device according to claim 5, wherein the buffer comprises:
    an operational amplifier, wherein a first input terminal of the operational amplifier receives the indication signal, a second input terminal of the operational amplifier is coupled to an output terminal of the operational amplifier, and the output terminal of the operational amplifier generates the current command.

7. The light source generating device according to claim 1, wherein the control device receives a current setting value, and after a delay time, the control device adjusts a current value of the driving current used for driving the first light source according to the current setting value.

8. The light source generating device according to claim 7, wherein the current command generator comprises:
    a processor, receiving the gate control signal to serve as the indication signal, receiving the current setting value, and generating the current command according to the gate control signal and the current setting value.

9. The light source generating device according to claim 8, wherein the processor generates a setting time point according to a pulse number of the gate control signal, generates the current command according to the current setting value, and writes the current command to the driver at the setting time point.

10. The light source generating device according to claim 9, wherein the setting time point is determined according to the delay time.

11. The light source generating device according to claim 9, wherein the processor counts the pulse number of the gate control signal, and sets the setting time point according to whether the pulse number of the gate control signal is greater than or equal to a predetermined value.

12. The light source generating device according to claim 8, wherein the processor transmits the current command to the driver through a data transmission interface,
wherein the data transmission interface is an inter-integrated circuit (I²C) interface, a serial peripheral interface (SPI), a universal asynchronous receiver and transmitter (UART) or a pulse width modulation (PWM) signal transmission interface.

13. The light source generating device according to claim 12, wherein the driver comprises a data receiver corresponding to the data transmission interface.

14. The light source generating device according to claim 13, wherein when the data transmission interface is a pulse width modulation (PWM) signal transmission interface, the data receiver is a low pass filter.

15. The light source generating device according to claim 7, further comprising:
at least one second light source, coupled to the control device, and providing at least one second light beam according to at least one second driving signal, wherein a light beam formed by combining the first light beam and the auxiliary light beam has a first color, the at least one second light beam has at least one second color,
wherein the control device determines a time point when the first light source provides the first light beam and a time point when the at least one second light source provides the at least one second light beam according to a channel selection signal.

16. The light source generating device according to claim 15, wherein the current command generator receives the channel selection signal to serve as the indication signal, and decodes the indication signal to acquire an enable time of the gate control signal.

17. A projection apparatus, comprising:
a light source generating device, adapted to provide an illumination light beam, and comprising:
a first light source, adapted to generate a first light beam, wherein the first light source comprises at least one first light emitting diode or at least one first laser diode;
an auxiliary light source, adapted to generate an auxiliary light beam corresponding to the first light beam, wherein the illumination light beam comprises the first light beam and the auxiliary light beam, and the auxiliary light source comprises at least one second light emitting diode or at least one second laser diode;
a control device, adapted to generate a first driving signal to drive the first light source;
a driver, coupled to the control device to receive a gate control signal, and adapted to generate an auxiliary driving signal to drive the auxiliary light source according to the gate control signal and a current command; and
a current command generator, coupled to the control device to receive an indication signal transmitted by the control device, and adapted to according to the indication signal to generate the current command to transmit to the driver to drive the auxiliary light source, wherein the indication signal corresponds to a driving current of the first light source;
a light valve, located on a transmission path of the illumination light beam, and adapted to convert the illumination light beam into an image light beam; and
a projection lens, located on a transmission path of the image light beam.

18. The projection apparatus according to claim 17, wherein a wavelength of the first light beam and a wavelength of the auxiliary light beam are the same or different.

19. The projection apparatus according to claim 17, wherein the light source generating device further comprises at least one second light source, the at least one second light source is coupled to the control device, and provides at least one second light beam according to at least one second driving signal,
wherein the illumination light beam further comprises the at least one second light beam,
wherein a light beam formed by combining the first light beam and the auxiliary light beam has a first color, the at least one second light beam has at least one second color, and the first color and the at least one second color are different.

20. A light source generation method, comprising:
providing a first light source to generate a first light beam, wherein the first light source comprises at least one first light emitting diode or at least one first laser diode;
providing an auxiliary light source to generate an auxiliary light beam corresponding to the first light beam, wherein the auxiliary light source comprises at least one second light emitting diode or at least one second laser diode;
providing a control device to generate a first driving signal to drive the first light source;
providing a driver to generate an auxiliary driving signal to drive the auxiliary light source according to a gate control signal and a current command; and
providing a current command generator to receive an indication signal transmitted by the control device and according to the indication signal to generate the current command to transmit to the driver to drive the auxiliary light source,
wherein the indication signal corresponds to a driving current of the first light source.

21. The light source generation method according to claim 20, wherein the step of providing the driver to generate the auxiliary driving signal to drive the auxiliary light source according to the gate control signal and the current command comprises:
providing the driver to control a time point when the auxiliary light source emits the auxiliary light beam according to the gate control signal, and providing the driver to control a brightness of the auxiliary light beam generated by the auxiliary light source according to the current command.

22. The light source generation method according to claim 20, wherein the step of providing the current command generator to receive the indication signal and generate the current command according to the indication signal comprises:
providing the current command generator to receive the gate control signal to serve as the indication signal, receiving a current setting value, and generating the current command according to the gate control signal and the current setting value.

23. The light source generation method according to claim 20, wherein the step of providing the current command generator to generate the current command according to the gate control signal and the current setting value comprises:

providing the current command generator to generate a setting time point according to a pulse number of the gate control signal, and generate the current command according to a current setting value, and write the current command to the driver at the setting time point.

* * * * *